United States Patent
Kuschel et al.

(10) Patent No.: US 10,109,991 B2
(45) Date of Patent: Oct. 23, 2018

(54) ARRANGEMENT COMPRISING A FLUID-INSULATED PHASE CONDUCTOR

(71) Applicant: SIEMENS AKTIENGESELLSCHAFT, Munich (DE)

(72) Inventors: Mark Kuschel, Berlin (DE); Nazmir Presser, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/533,795

(22) PCT Filed: Nov. 19, 2015

(86) PCT No.: PCT/EP2015/077049
§ 371 (c)(1),
(2) Date: Jun. 7, 2017

(87) PCT Pub. No.: WO2016/096314
PCT Pub. Date: Jun. 23, 2016

(65) Prior Publication Data
US 2017/0331266 A1 Nov. 16, 2017

(30) Foreign Application Priority Data
Dec. 16, 2014 (DE) .................. 10 2014 226 016

(51) Int. Cl.
*H05K 5/06* (2006.01)
*H02G 5/06* (2006.01)

(52) U.S. Cl.
CPC ............ *H02G 5/063* (2013.01); *H02G 5/066* (2013.01)

(58) Field of Classification Search
CPC .......... H02G 5/06; H02G 5/063; H02G 5/066; H02G 5/061; H02G 3/04; H02G 3/02; H01R 4/70
USPC ....... 174/68.1, 17.5, 17 R, 17 LF, 17 GF, 27, 174/17.05
See application file for complete search history.

(56) References Cited

U.S. PATENT DOCUMENTS

| | | | | |
|---|---|---|---|---|
| 3,621,110 | A * | 11/1971 | McGrath | H02G 9/00 174/25 R |
| 3,909,501 | A | 9/1975 | Johnson | |
| 4,783,576 | A | 11/1988 | Silver et al. | |
| 7,928,320 | B2 * | 4/2011 | Nevett | H01B 11/04 174/27 |
| 7,946,031 | B2 * | 5/2011 | Caveney | H01B 11/04 174/27 |

(Continued)

FOREIGN PATENT DOCUMENTS

| | | |
|---|---|---|
| DE | 7345360 U | 9/1975 |
| DE | 2514264 A1 | 9/1976 |
| DE | 2649398 A1 | 5/1978 |

(Continued)

*Primary Examiner* — Angel R Estrada
(74) *Attorney, Agent, or Firm* — Laurence Greenberg; Werner Stemer; Ralph Locher

(57) ABSTRACT

An arrangement includes an encapsulation housing and a fluid-insulated phase conductor which is disposed within the encapsulation housing, so that an electrically insulating fluid flows around the phase conductor. The phase conductor has a plurality of electrically parallel conductor tracks, at least in some sections. The conductor tracks mutually support each other.

13 Claims, 2 Drawing Sheets

(56) References Cited

U.S. PATENT DOCUMENTS 8,198,532 B2 * 6/2012 Chen .................. H01R 4/70
                                                    174/17 R

FOREIGN PATENT DOCUMENTS

| DE | 10315609 A1  | 10/2004 |
|----|--------------|---------|
| EP | 0980078 A1   | 2/2000  |
| EP | 2637179 A1   | 9/2013  |
| FR | 2217840 A1   | 9/1974  |
| GB | 481408 A     | 3/1938  |
| WO | 2010142518 A1| 12/2010 |

* cited by examiner

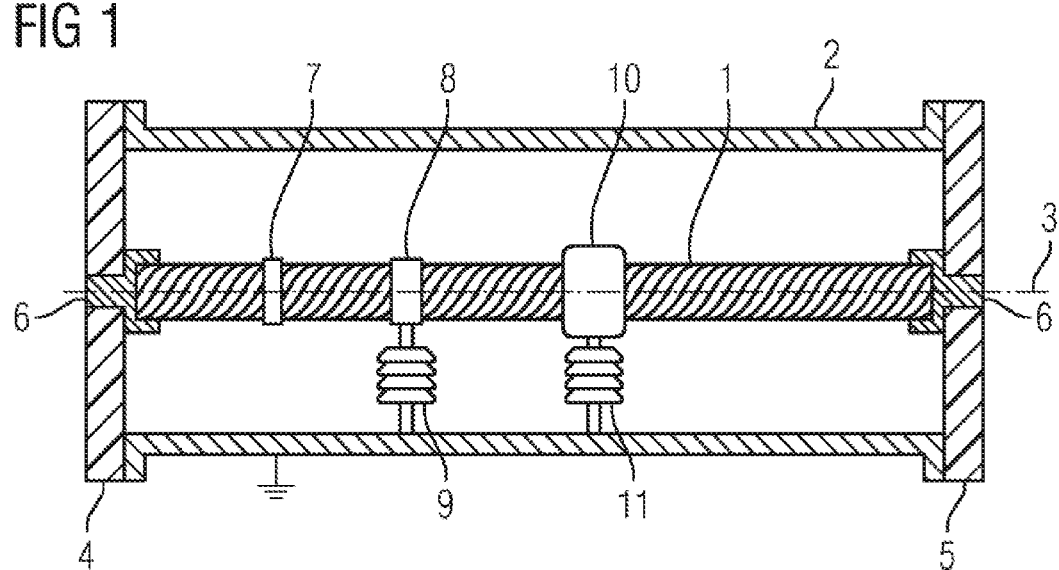
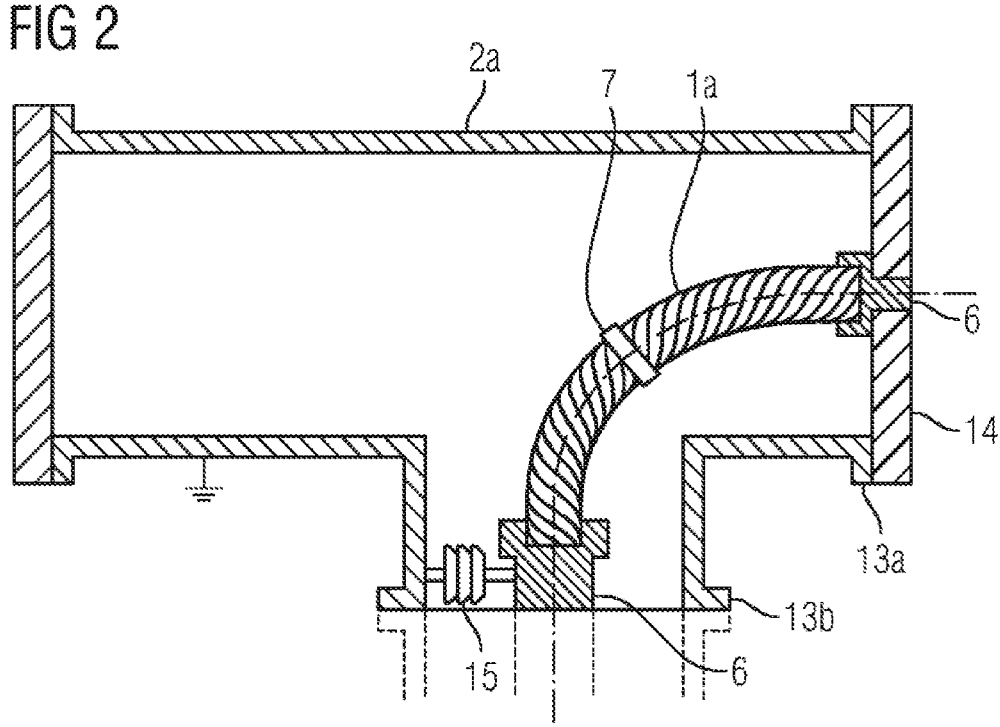

ARRANGEMENT COMPRISING A FLUID-INSULATED PHASE CONDUCTOR

BACKGROUND OF THE INVENTION

Field of the Invention

The present invention relates to an arrangement having a fluid-insulated phase conductor, which is arranged within an encapsulation housing in such a way that an electrically insulating fluid flows around it, wherein the phase conductor is divided at least in certain sections into a plurality of conductor tracks.

Such a fluid-insulated phase conductor is known, for example, from French laid-open application FR 2217840. The fluid-insulated phase conductor in said document is provided to be arranged within a metallic housing, wherein the housing is filled with an electrically insulating gas. In order to compensate changes in length of the phase conductor, the phase conductor is divided in certain sections into a plurality of conductor tracks which extend in parallel. The conductor tracks are made to extend in a wound helical shape in order to bring about good mobility with low mechanical stress. The deformation of the helical conductor tracks occurs in accordance with the relative movements in the phase conductor there.

In order to stabilize the phase conductor, a central guide rail is provided which stabilizes a telescopic axial change in length of the phase conductor. In addition, a hood engages around the helical conductor tracks. This results in an arrangement which can be activated with little force, in order to compensate changes in length in a phase conductor. However, the known design can be considered to be mechanically complex and therefore costly.

SUMMARY OF THE INVENTION

The invention is based on the object of specifying a fluid-insulated phase conductor which can compensate changes in shape while having a simplified design.

According to the invention, the object is achieved with a fluid-insulated phase conductor which is of the type mentioned at the beginning, the conductor tracks support one another.

A phase conductor serves to conduct an electrical current, wherein the phase conductor has to be insulated electrically in order to prevent shorts to earth or short-circuits. The use of an electrically insulating fluid for electrically insulating a phase conductor has the advantage that automatic regeneration of faults can be brought about by eddying of the fluid. It is therefore possible, for example, for breakdown channels to be closed virtually automatically by the fluid. The electrically insulating fluid should preferably be enclosed within an encapsulation housing, wherein the fluid-insulated phase conductor is arranged at least in certain sections within the encapsulation housing. There is therefore the possibility of the electrically insulating fluid flowing around, if appropriate flowing through, the phase conductor. Therefore, apart from the electrically insulating effect of the electrically insulating fluid, the latter can also be used to cool the fluid-insulated phase conductor. The electrically insulating fluid can form an electrically insulating section between the phase conductor and encapsulation housing. It is therefore possible, for example, to equip the encapsulation housing with a potential which differs from the electrical potential of the phase conductor. The encapsulation housing should preferably be embodied in a hermetically sealed fashion, with the result that the electrically insulating fluid cannot escape from the encapsulation housing and cannot be contaminated by other media. The use of a fluid insulating medium makes it possible to dispense with solid insulation on the phase conductor, at least in certain sections. It can be provided that in each case only phase conductors which are intended to conduct the same electrical potential are arranged within an encapsulation housing. A separate fluid volume flows around this phase conductor/these phase conductors. Further phase conductors which are provided for conducting a different electrical potential are arranged in separate encapsulation housings in such a way that fluid volumes which are respectively separated from one another flow around them. Such a configuration is referred to as a single-phase-encapsulated arrangement.

It is also possible to provide that within an encapsulation housing the same fluid volume flows around a plurality of phase conductors, which are electrically insulated from one another. In this case, the term multi-phase-encapsulated arrangement is used. The phase conductors can conduct electrical potentials that are different from one another. In order to transmit a 3-phase voltage system, phase conductors, which are provided for conducting three different electrical potentials, can be arranged electrically insulated from one another by the same fluid volume within a common encapsulation housing.

An encapsulation housing is understood to be a barrier which encloses a fluid.

Dividing the phase conductor into a plurality of conductor tracks which run in parallel with one another has, on the one hand, the advantage that heat can be discharged from the individual conductor tracks to the outside in an improved fashion. On the other hand, there is a resulting advantageous division of a current, which is to be conducted through the phase conductor, into a plurality of component currents. Each of the conductor tracks can therefore carry a portion of an entire current which is to be conducted through the phase conductor. Current expulsion effects, for example owing to heat or frequency, can occur in any of the individual component conductors, with the result that compared to a single-piece phase conductor more efficient use of the conducting material can take place. It is therefore possible for the current-carrying capacity of a phase conductor having a plurality of conductor tracks to be higher than that of a phase conductor which has the same cross section and which is embodied in one piece.

By means of mutual support of the individual conductor tracks, a flexurally rigid assembly of conductor tracks can be formed, with the result that, despite division into a plurality of conductor tracks, the conductor tracks support one another. The conductor tracks can advantageously support one another in a frictionally locking fashion. It is therefore possible, for example, for frictional forces to occur between conductor tracks. For example, in particular when the phase conductor bends out, the conductor tracks can bear one against the other in a frictionally locking fashion, with the result that relative movements between the conductor tracks can occur, but said conductor tracks must overcome frictional forces between their bearing faces. In addition to deformation of the conductor tracks of the phase conductor owing to external forces, deformation can also occur to a limited degree as a result of heat effects. In this context, the conductor tracks permit limited deformation or relative movements of the conductor tracks with respect to one another despite a flexurally rigid embodiment of the phase conductor. In this context, the supporting function of the conductor tracks with respect to one another is retained, as a result of which frictional forces have to be overcome when relative movements occur. Owing to the frictional forces which have to be overcome, a fixed-angle composite body is produced which forms the phase conductor. Adjacent supporting faces of the conductor tracks can be embodied with complementary shapes. Adjacent supporting faces can preferably be formed in an essentially congruent fashion. Planar abutment of the conductor tracks can therefore occur via supporting faces. If appropriate, supporting faces can bear one against the other with intermediate positioning of a further assembly. Subdivision of the phase conductor also permits an electrically insulating fluid also to be allowed to penetrate into joint gaps between the phase conductors. As a result, improved conduction of heat away from the interior of the phase conductor can be achieved.

A further advantageous refinement can provide that the conductor tracks support one another on an enclosed circuit.

The conductor tracks which run electrically in parallel result in a current path profile within the phase conductor, to which current path profile a circuit is aligned essentially transversely. The current path profile corresponds to a main extent axis along which the phase conductor extends. This main extent axis can run linearly, in a curved fashion etc. The circuit is preferably embodied in a closed fashion, with the result that the conductor tracks follow one another infinitely in the direction of circulation. Stabilization forces for stabilizing the conductor tracks with respect to one another can act on the conductor tracks in radial directions, wherein the conductor tracks abut one another indirectly or directly, for example with supporting faces, and therefore support one another. As a result of shaping (cross section) of the conductor tracks it is possible to deflect radial forces, for example into lateral forces, with the result that a pressing force of the conductor tracks against one another and therefore support of said conductor tracks is reinforced. In order to assist combination of the conductor tracks, forces acting radially from the outside can be applied to the phase conductor. This can increase, at least in certain sections, in particular the frictional forces between the conductor tracks (in particular over the supporting faces).

A further advantageous refinement can provide that at least one of the conductor tracks is embodied with multiple wires.

A multi-wire embodiment of a conductor track makes it possible to equip the conductor track itself with increased elasticity or flexibility. The conductor tracks should preferably be embodied in the same fashion with the result that, for example, all the conductor tracks are embodied with multiple wires. As a result, the cross section, which is provided for conducting current, within one conductor track is divided into a plurality of individual cross sections of wires, wherein the individual wires touch one another and are placed in electrical contact with one another. The multi-wire design allows the phase conductor to be shaped in a simplified fashion and to react in an improved way to changes in length, for example conditioned by heat effects.

A further advantageous refinement can provide that the conductor tracks each form a segment of the phase conductor.

The phase conductor should advantageously have a plurality of conductor tracks which each form a segment of the phase conductor. In this context, the cross sections of the conductor tracks can be shaped approximately in the same way. For example, a conductor track can have an essentially trapezoidal or triangular cross section, wherein the conductor track can have an essentially prismatic structure. The conductor tracks can support one another by means of lateral faces of the segments of the conductor tracks. A lateral face can serve, at least in certain sections, as a supporting face.

It is also advantageously possible to provide that the conductor tracks form an essentially circular envelope contour of the phase conductor.

If the conductor tracks bound a circular envelope contour, a dielectrically favorable outer shape is provided, with the result that homogeneous distribution of an electrical field at the conductor track can occur. Deviations in shape can be provided in the envelope contour. The irregular deformations can be brought about, for example, by joint gaps between conductor tracks. The phase conductor should preferably have a circular envelope contour, wherein the phase conductor has, for example, a circular or circular-ring-shaped cross section. A conductor track can preferably have a cross section in the form of a circular cutout or a circular ring cutout, wherein the conductor tracks can preferably have cross sections of the same type.

In particular when a circular-ring-shaped cross section is used for a phase conductor, preferred support of the conductor tracks on one another can be provided, wherein a duct, through which electrically insulating fluid can flow, can be formed in the interior of the phase conductor. Such a design also has the advantage that the ring structure of the phase conductor is retained even when there are relatively large changes in length of the phase conductor, since compensation movements can occur into the duct. The circular ring recess (duct) can be used as a compensation volume, in order to absorb relative movements between the conductor sections.

A further advantageous refinement can provide that the conductor tracks support one another by means of supporting faces which are protected against direct contact with one another by an electrically insulating medium.

As a result of electrical insulation of, in particular, adjacently arranged supporting faces with respect to one another, by means of which supporting faces the conductor tracks stabilize one another, an insulating section is provided between the conductor tracks, which prevents undesired transfer of current components between the conductor tracks which run electrically in parallel. When electrical cross-connections between the conductor tracks are prevented in this way, the conductor tracks can also be movable relative to one another. An electrically insulating medium separates supporting faces from one another. Forces can be transmitted via the supporting means. The conductor tracks can be supported and stabilized via the supporting faces (for example with the intermediate positioning of an insulating section). Discrete components such as electrically insulating shaped bodies, electrically insulating coverings such as wrappings etc. can be used as the electrically insulating medium. Furthermore, electrically insulating coatings such as, for example, paint coatings, oxide layers, etc. can also be used. An electrically insulating medium can preferably be arranged in a joint gap between supporting faces. Additionally, electrically insulating media (insulating section) can assist axial displacement between the conductor tracks, permitting easy movement within the phase conductor or the conductor tracks of the phase conductor relative to one another. The frictional forces between the conductor tracks can be adjusted by suitable selection of the material for the electrically insulating medium.

It is advantageously possible to provide that the conductor tracks are braided with one another.

Braiding of the conductor tracks with one another brings about increased stability of the phase conductor, wherein support of the conductor tracks on one another continues to be ensured. In this context, longitudinal stability of the conductor tracks is increased by braiding. Axial movements between the conductor tracks can be absorbed in an improved way in the phase conductor.

A further advantageous refinement can provide that wires forming a conductor track are braided within the conductor track.

By braiding the wires of a conductor track, it is possible to form a multiply braided phase conductor which has improved resistance to mechanical loading, wherein changes in length which are to be compensated can be absorbed in an improved way under reduced loading of the individual wires of the conductor tracks.

Furthermore, it is advantageously possible to provide that the wires and the conductor tracks are braided in the same direction.

Braiding the wires and the conductor tracks in the same direction makes it possible to avoid interstices in the conductor tracks or between the conductor tracks through braiding in the same direction and to reduce the extent of said interstices. The flexural rigidity of the phase conductor can therefore be additionally improved. Furthermore, the installation space which is necessary to transmit an electrical current is reduced.

Furthermore, it is advantageously possible to provide that the phase conductor is supported on the encapsulation housing.

The encapsulation housing surrounds the electrically insulating fluid and preferably seals it hermetically. The phase conductor can be supported relative to the encapsulation housing. For this purpose, it is possible to use insulation arrangements which produce a mechanical bridge between the phase conductor and the encapsulation housing, wherein this mechanical bridge acts in an electrically insulating fashion. The mechanical bridge crosses the electrically insulating fluid. It is also possible to provide that the encapsulation housing acts, at least in certain sections, in an electrically insulating fashion, as a result of which direct support/embedding of the phase conductor on the encapsulation housing is made possible. The electrically insulating section on the encapsulation housing can be part of a fluid-tight barrier of the encapsulation housing. A supporting element (insulation arrangement) can, for example, cross the fluid insulation. For example disk insulators which can be crossed by the phase conductor can be used as electrically insulating sections of the encapsulation housing. A supporting element (insulation arrangement) can bear, for example, against/in an internal wall of the encapsulation housing and position the phase conductor relative to the latter.

A further advantageous refinement can provide that the phase conductor is supported on the encapsulation housing in a punctiform fashion.

Punctiform support of the phase conductor on the encapsulation housing makes it possible to permit relative movements of the phase conductor distributed over the length of the phase conductor. For example, relative movements between the conductor tracks can be distributed over a lengthened travel distance, with the result that mechanical loading of the phase conductor is reduced locally or is distributed over a multiplicity of points. It is therefore possible, for example, for kinking of the phase conductor to occur owing to thermal influences.

A further advantageous refinement can provide that a fitting body clamps in the phase conductor.

A fitting body can additionally stabilize the phase conductor in that the latter applies, for example, forces from the outside on the phase conductor with the result that the conductor tracks are supported on one another. A fitting body can therefore engage, for example, around a phase conductor along a circuit and press the conductor tracks one against the other, with the result that the latter support one another. The phase conductor is advantageously clamped in a fitting body, with the result that a rigid-angle joint is provided between the fitting body and the phase conductor. The phase conductor can, for example, also be supported on the encapsulation housing via the fitting body. The fitting bodies can, for example, be embodied in an electrically conductive or electrically insulating fashion, wherein said fitting bodies can be connected to an electrical insulator or can themselves act as an electrical insulator. The fitting body can be embodied, for example, as a shaped part. However, it is also possible to provide for flexibly deformable fitting bodies to be used. It is therefore possible, for example, to use wrappings in order to be able to impress an external force on the phase conductor.

A further advantageous refinement can provide that the electrically insulating fluid is under excess pressure.

Compressing the fluid generally has a positive influence on the electrical insulation capability thereof. In particular, in the case of gaseous fluids, their dielectric strength can be increased by an increase in pressure. The insulation distance which is available by means of the fluid can therefore be reduced. Suitable fluids are, in particular, gaseous sulfurhexafluoride, nitrogen, carbon dioxide, etc. and mixtures with these gases.

It is also advantageously possible to provide that the encapsulation housing is a pressure vessel.

The configuration of the encapsulation housing as a pressure vessel provides, on the one hand, the possibility of preventing evaporation and contamination of the fluid. On the other hand, the encapsulation housing can withstand the forces occurring as a result of the presence of differential pressures between the interior of the encapsulation housing and the exterior of the encapsulation housing. Additional pressure vessels are therefore not necessary. The encapsulation housing can therefore serve, on the one hand, to absorb pressure forces and, on the other hand, to position the phase conductor in the interior of the encapsulation housing and to protect the electrically insulating fluid against contamination and evaporation.

BRIEF DESCRIPTION OF THE SEVERAL VIEWS OF THE DRAWING

An exemplary embodiment of the invention is shown schematically in a drawing and is described in more detail below. In the drawing:

FIG. 1 shows a cross section through a fluid-insulated phase conductor in a first embodiment variant, FIG. 2 shows a cross section through a fluid-insulated phase conductor in a second embodiment variant.

DESCRIPTION OF THE INVENTION

Figure 3:
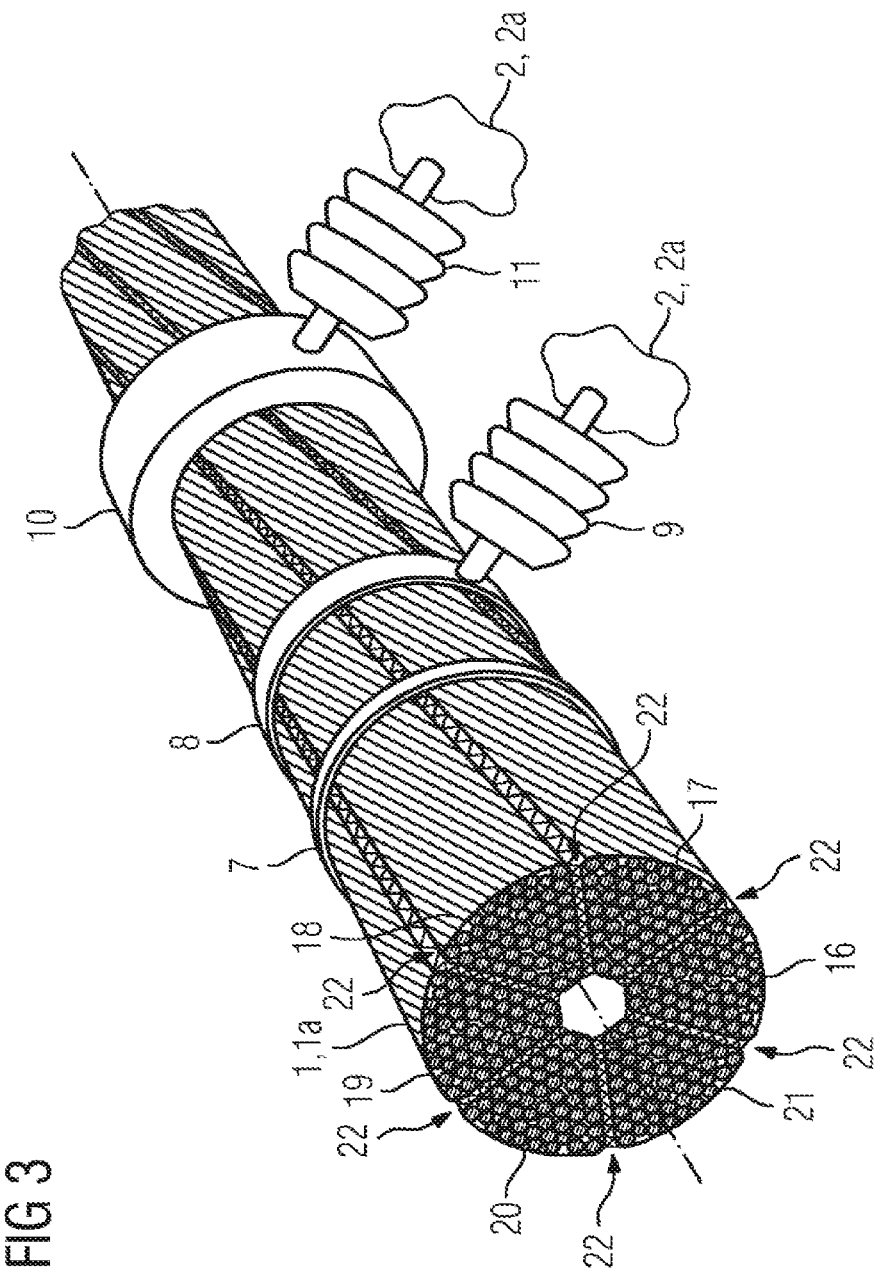
FIG. 3 shows a perspective view of the fluid-insulated phase conductors known from FIGS. 1 and 2.

FIG. 1 shows a fluid-insulated phase conductor 1 in a first embodiment variant. The phase conductor 1 according to FIG. 1 has a linearly extending structure, wherein the phase conductor 1 according to FIG. 1 has an essentially circular-ring-shaped cross section (cf. also FIG. 3). The phase conductor 1 according to FIG. 1 is arranged in the interior of an encapsulation housing 2. The encapsulation housing 2 is configured essentially in a hollow-cylindrical fashion and has a rotational axis 3. The phase conductor 1 is aligned essentially coaxially with the rotational axis 3 here. At the end the encapsulation housing 2 has a first disk insulator 4 and a second disk insulator 5. The disk insulators 4, 5 are part of a fluid-tight barrier of the encapsulation housing 2. The two disk insulators 4, 5 are each penetrated centrally by a fitting body 6. The fitting body 6 is inserted in a fluid-tight fashion into the respective disk insulators 4, 5, with the result that the two disk insulators 4, 5 form a fluid-tight barrier on the encapsulation housing 2 with the fitting bodies 6 which are each embedded in said disk insulators 4, 5. The interior of the encapsulation housing 2 is filled with an electrically insulating fluid which conducts excess pressure. The encapsulation housing 2 is, for example, electrically conductive in certain sections and can have ground potential applied to it.

In the sides, facing one another, of the fitting body 6, in each case socket-shaped recesses are provided into which the front-side ends of the phase conductor 1, which face away from one another, project. The ends of the phase conductor 1 which lie in the socket-shaped recesses in the fitting bodies 6 are placed in electrical contact with the respective fitting body 6. For this purpose, for example pressing, welding, soldering, screwing, clamping, etc. of the respective fitting body 6 and of the respective end of the phase conductor 1 can be provided.

In order to stabilize individual conductor tracks 16, 17, 18, 19, 20, 21 with respect to one another (cf. also FIG. 3), a first fitting body 7 is provided. The first fitting body 7 is in the form of a ring which engages, in particular in a closed fashion, around the phase conductor 1 in the circulation direction. This ring in the form of a first fitting body 7 prevents the individual conductor tracks of the phase conductor 1 from being driven apart from one another and clamps them against one another. Supporting faces of the conductor tracks 16, 17, 18, 19, 20, 21 support one another. The first fitting body 7 can be embodied, for example, in an electrically conductive or else electrically insulating fashion.

Furthermore, a second fitting body 8 is provided which can be embodied so as to act in an electrically conductive fashion and/or dielectrically insulating fashion. The second fitting body 8 also surrounds and engages around the phase conductor 1, wherein the second fitting body 8 is connected to a supporting insulator 9. The supporting insulator 9 forms a mechanical connection between the phase conductor 1 and the encapsulation housing 2. The supporting insulator 9 is supported on the internal lateral side on the encapsulation housing 2 and forms a punctiform support of the phase conductor 1. The supporting insulator 9 crosses the electrically insulating fluid.

A third fitting body 10 also clamps in the phase conductor 1 according to FIG. 1. In this context, the third fitting body 10 is formed from electrically insulating material, wherein the third fitting body 10 is connected to a supporting insulator 11. The supporting insulator 11 can be an integral component of the third fitting body 10. However, it is also possible to provide that the supporting insulator 11 is formed as a discrete component. The first, second and third fitting bodies 7, 9, 10 each stabilize the phase conductor 1. Likewise, the fitting bodies which are arranged at the end are suitable for stabilizing the phase conductor 1. Furthermore, the second fitting body 8, the third fitting body 10 and the two fitting bodies 6, which are inserted into the first and second disk insulators 4, 5, serve to provide punctiform support to the phase conductor 1. The fitting bodies 7, 9, 10 clamp the conductor tracks 16, 17, 18, 19, 20, 21 of the phase conductor 1.

FIG. 2 illustrates a different laying form of a phase conductor 1a. The phase conductor 1a has a curved profile, with the result that it runs between flanges 13a, 13b which are arranged on an encapsulation housing 2a and lie essentially at a right angle to one another. The one flange 13a is sealed with a disk insulator 14, in a way which is analogous to the refinement according to FIG. 1. In the disk insulator 14, a fitting body 6, as is known from FIG. 1, is used. In this fitting body 6, a socket-shaped recess is arranged, into which socket-shaped recess the phase conductor 1a with a curved profile is inserted by one of its front-side ends. The curved phase conductor 1a leads, with its other front-side end, into a fitting body 6 which is, however, not secured by means of a disk insulator but rather by means of a column-shaped supporting insulator 15. The column-shaped supporting insulator 15 is supported on the inner lateral side on the encapsulation housing 2a. The two socket-shaped recesses of the fitting body 6 according to FIG. 2 are aligned essentially at a right angle to one another, with the result that the phase conductor 1a runs along a path which is curved essentially through 90°.

As a result of the use of a fitting body 6 on a column-shaped supporting insulator 15 there is the possibility of flange-connecting a further housing to the encapsulation housing 2a according to FIG. 2, which further housing can bring about fluid-tight termination of the encapsulation housing 2 according to FIG. 2.

In order to stabilize the phase conductor 1a according to FIG. 2, a first fitting body 7, which stabilizes the individual conductor tracks 16, 17, 18, 19, 20, 21 of the phase conductor 1a according to FIG. 2, is arranged at said phase conductor 1a. Furthermore, further fitting bodies such as are known from FIG. 1 can also be used.

FIGS. 1 and 2 each show arrangements of a phase conductor 1, 1a which are encapsulated in a single phase, for example. Use of the invention can also be carried out in multi-phase encapsulation arrangements. That is to say the same insulation fluid volume can flow around a plurality of phase conductors within a common encapsulation housing.

FIG. 3 illustrates a perspective view of a sectional phase conductor 1, 1a as is known from FIGS. 1 and 2. Furthermore, by way of example the position of a first fitting body 7, of a second fitting body 8 and of a third fitting body 10, as are known from FIG. 1, is also illustrated in the perspective view according to FIG. 3. For example, an encapsulation housing 2; 2a is illustrated in a detail. The circular-ring-shaped cross section of the phase conductor 1, 1a can be seen in the end-side view thereof, wherein the cross section of the phase conductor 1, 1a is divided into a plurality of zones. The zones each form an end side of a conductor track 16, 17, 18, 19, 20, 21. The conductor tracks 16, 17, 18, 19, 20, 21 are supported on one another in a circuit by supporting faces. Each of the conductor tracks 16, 17, 18, 19, 20, 21 is constructed with multiple wires, wherein each of the conductor tracks 16, 17, 18, 19, 20, 21 has wires which are braided with each other. Furthermore, the conductor tracks 16, 17, 18, 19, 20, 21 are braided with each other, wherein the braiding direction of the wires of the individual conductor tracks 16, 17, 18, 19, 20, 21 corresponds to the braiding direction of the conductor tracks 16, 17, 18, 19, 20, 21.

The supporting faces are lateral faces of the respective prismatic conductor tracks 16, 17, 18, 19, 20, 21. Owing to the braiding of the conductor tracks 16, 17, 18, 19, 20, 21, the prism longitudinal axes (cylinder axes) of the conductor tracks 16, 17, 18, 19, 20, 21 follow a helical profile. Supporting faces of adjacent conductor tracks 16, 17, 18, 19, 20, 21 face one another and bear indirectly with the intermediate positioning of an electrically insulating medium 22. The electrically insulating medium 22 is, for example, an electrically insulating film which prevents direct contact between the supporting faces. Lateral faces of the conductor tracks 16, 17, 18, 19, 20, 21, which are positioned in a radially outer fashion, bound the envelope contour of the phase conductor 1, 1a. Apart from interruptions in the joint region of the conductor tracks 16, 17, 18, 19, 20, 21 and notches between wires or respective conductor tracks 16, 17, 18, 19, 20, 21, the phase conductor 1, 1a has a circular envelope contour. A duct, through which the electrically conductive fluid flows, is arranged centrally in the phase conductor. Alternatively, a further conductor track can also be arranged there in such a way that it fits in with a complementary shape. It is also possible to provide that the duct is filled with an electrically insulating medium. The electrically insulating medium can expand in the manner of a fin into the joint gap between the conductor tracks 16, 17, 18, 19, 20, 21 and continue in the manner of a screw in the axial direction. In each case an electrically insulating medium 22 is arranged between the in particular adjacent supporting faces with which the individual conductor tracks 16, 17, 18, 19, 20, 21 support one another. For example a solid insulator or some other suitable electrically insulating medium which can transmit forces between the individual conductor tracks 16, 17, 18, 19, 20, 21, and at the same time retains its electrical insulation properties, can be used as the electrically insulating medium.

The invention claimed is:

1. An arrangement, comprising:
an encapsulation housing;
a fluid-insulated phase conductor disposed within said encapsulation housing to permit an electrically insulating fluid to flow around said phase conductor, said phase conductor being divided at least in sections into a plurality of conductor tracks;
said conductor tracks have supporting faces; and
said conductor tracks supporting one another, said conductor tracks support one another at said supporting faces; and
an electrically insulating medium protects said supporting faces against direct contact with one another.

2. The arrangement according to claim 1, wherein said conductor tracks support one another in an enclosed circuit.

3. The arrangement according to claim 1, wherein at least one of said conductor tracks includes multiple wires.

4. The arrangement according to claim 1, wherein said conductor tracks each form a segment of said phase conductor.

5. The arrangement according to claim 1, wherein said conductor tracks form a substantially circular envelope contour of said phase conductor.

6. The arrangement according to claim 1, wherein said conductor tracks are braided with one another.

7. The arrangement according to claim 1, wherein said conductor tracks are formed of wires being braided within said conductor tracks.

8. The arrangement according to claim 7, wherein said wires and said conductor tracks are braided in the same direction.

9. The arrangement according to claim 1, wherein said phase conductor is supported on said encapsulation housing.

10. The arrangement according to claim 1, wherein said phase conductor is supported on said encapsulation housing in a punctiform manner.

11. The arrangement according to claim 1, which further comprises a fitting body clamping-in said phase conductor.

12. The arrangement according to claim 1, wherein said encapsulation housing maintains the electrically insulating fluid under excess pressure.

13. The arrangement according to claim 1, wherein said encapsulation housing is a pressure vessel.

* * * * *